United States Patent [19]

Regipa

[11] Patent Number: 4,457,477
[45] Date of Patent: Jul. 3, 1984

[54] PROCESS FOR ALTITUDE-STABILIZING A BALLOON, AND ATMOSPHERIC BALLOONS FOR IMPLEMENTING THIS PROCESS

[75] Inventor: Robert Regipa, Toulouse, France

[73] Assignee: Centre National d'Etudes Spatiales, Paris, France

[21] Appl. No.: 387,471

[22] Filed: Jun. 11, 1982

[30] Foreign Application Priority Data

Jul. 8, 1981 [FR] France ................... 81 13813

[51] Int. Cl.³ .................. B64B 1/44; B64B 1/70
[52] U.S. Cl. .......................... 244/97; 244/31; 244/94; 244/98
[58] Field of Search ............... 244/96–99, 244/31–33, 125, 127, 128, 94

[56] References Cited

U.S. PATENT DOCUMENTS

| | | | |
|---|---|---|---|
| 256,366 | 4/1882 | Peterson | 244/97 |
| 2,904,284 | 9/1959 | Huch | 244/94 |
| 4,084,771 | 4/1978 | Creuzet | 244/98 |

FOREIGN PATENT DOCUMENTS

| | | | |
|---|---|---|---|
| 2360089 | 2/1978 | France | 244/99 |
| 9799 | of 1908 | United Kingdom | 244/99 |
| 130657 | 8/1919 | United Kingdom | 244/97 |
| 101488 | 1/1920 | United Kingdom | 244/99 |

Primary Examiner—Galen L. Barefoot
Attorney, Agent, or Firm—Shlesinger, Arkwright, Garvey & Fado

[57] ABSTRACT

A process for altitude-stabilizing an atmospheric balloon comprising ballast jettison mechanism to vary the balloon's specific weight, and using a balloon provided with an interpole link for actuating said ballast jettison mechanism so that an increase in the tension in the link causes a reduction in the specific weight of the balloon by jettison of ballast is disclosed.

24 Claims, 18 Drawing Figures

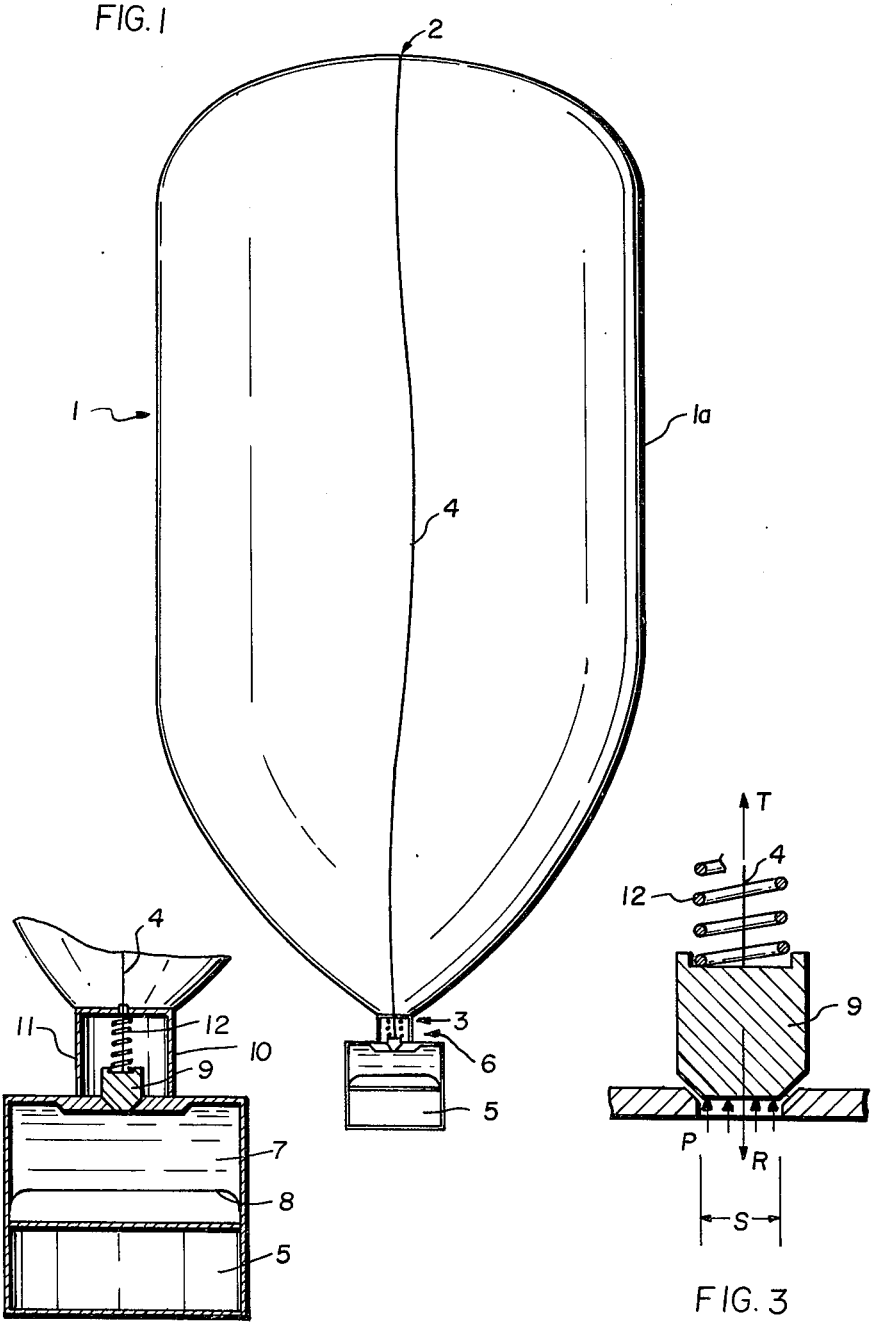

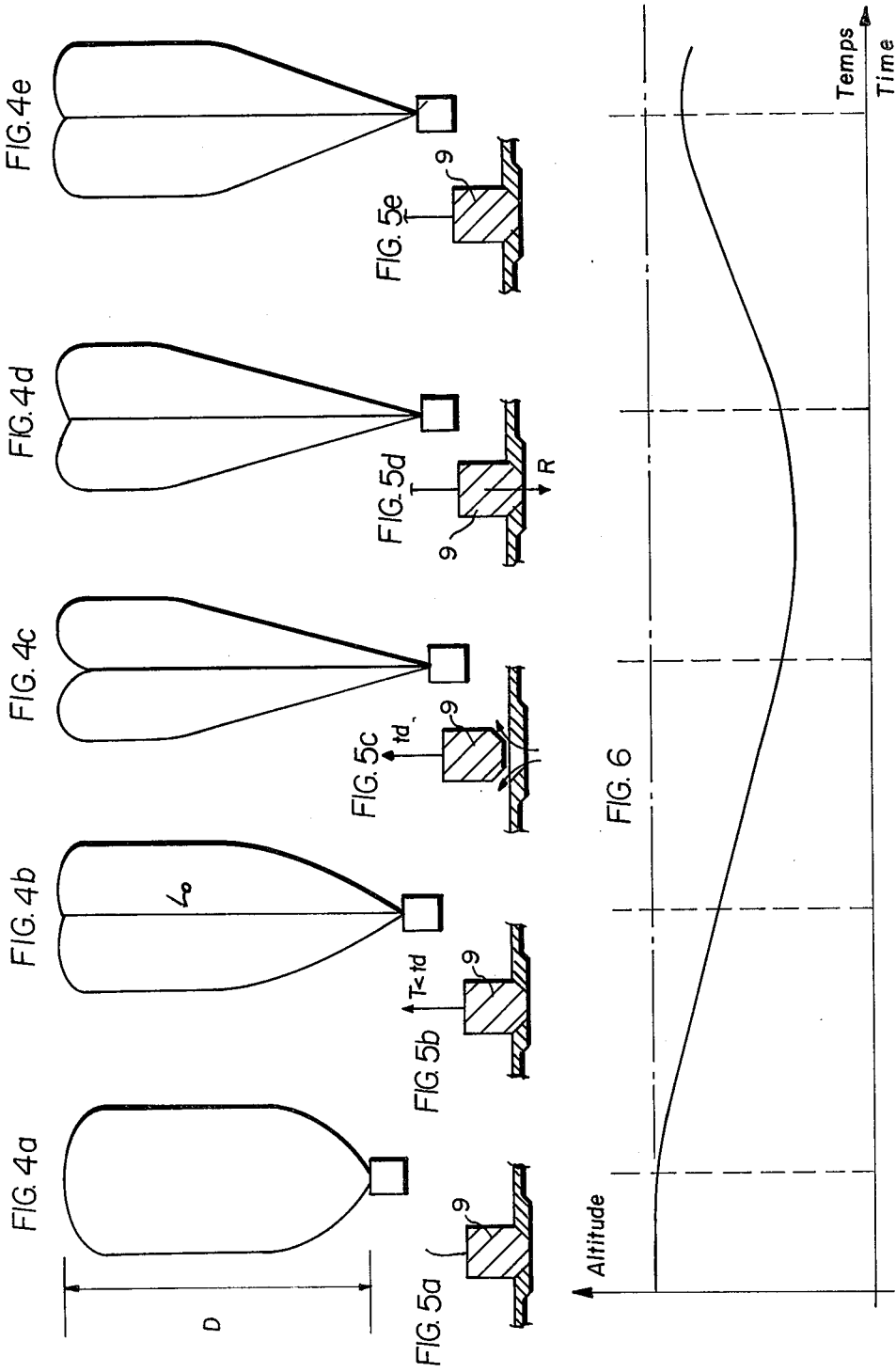

PROCESS FOR ALTITUDE-STABILIZING A BALLOON, AND ATMOSPHERIC BALLOONS FOR IMPLEMENTING THIS PROCESS

This invention relates to an altitude-stabilization process for an atmospheric balloon comprising means for varying specific weight, such as jettisoning means, means for evacuating aerostatic gases, or also means for adjusting the heat transferred to the air contained in the balloon if the aerostatic balloon is of the hot-air type. The invention also covers atmospheric balloons designed to implement said process.

BACKGROUND AND OBJECTS

It is known that the balloon equilibrium at a given altitude in the atmosphere depends on the displaced volume of air of which the mass must be balanced by the sum of the solid and gaseous masses carried by the balloon. Stable equilibrium is achieved at a given altitude when the vertical balloon displacement takes place in the presence of at least one parameter being modified (which concerns the balloon or the ambient atmosphere), tending to return the balloon to its starting point.

Thus, only a pressurized balloon within which the pressurized gas always remains at constant volume is inherently stable at a given altitude. A balloon which is open at its lower part is stable in ascent due to the natural evacuation of the aerostatical gas that takes place at constant volume; but on the other hand it is unstable in descent when its volume decreases. A balloon far from its filled state (i.e., when limp) is unstable and rises or descends depending on the thermal balance controlling its gas-bulb volume and the change in the gas mass (such a change being caused by diverse phenomena and in particular being due to diffusion through the envelope.

Now it is often desired in many missions (particularly scientific missions) to keep a balloon for some time at a constant altitude or only slowly varying its altitude in ascent or descent at a given altitude or at several desired altitude levels. Frequently the altitude levels that are desired correspond to a limp balloon state.

To assure this stabilization (where this term means both staying at a constant altitude and rising or descending in controlled manner), the generally adopted procedure is to modify the specific weight of the balloon by either jettisoning ballast or evacuating part of its aerostatic gas. These operations are initiated by electromechanical systems which in some instances are ground-controlled by a remote radio-electric control, and in other cases from the balloon by pick-ups mounted to it which measure certain parameters, typically the temperature and the atmospheric pressure, which after analysis allow effecting the controls. However the ambient atmosphere as a rule will not be calm due to vertical winds, turbulence etc., and it is a fairly complex matter to collect useful parameters. The corresponding equipment, which must be functional through the entire balloon lift and sometimes in a harsh environment, strongly deviates from the ideal rated operation of the electronic and supply circuits (temperatures less than $-100°$ C. or exceeding $+100°$ C.), and such equipment is complex, costly and heavy. Moreover, it generally uses up a lot of ballast and accordingly is poorly suited for the atmospheric-planet type of exploration wherein the total balloon mass must be as low as possible (the balloon is understood to be the balloon proper and all material therein).

The object of the present invention is thus to overcome the drawbacks of the conventional systems and to provide an altitude-stabilizing system for a balloon. The invention, deals with a process for stabilizing an atmospheric balloon of the type comprising means to vary its specific weight, in particular jettisoning means designed to reduce the balloon mass, means for evacuating the aerostatic gas, or, in the case of a hot-air balloon, a burner fed by a fluid fuel.

A particular object of the invention is to assure balloon-stabilization by using substantially simplified equipment of which the cost and the weight are significantly reduced with respect to those of conventional systems.

Another object is to create novel balloon forms which are better suited to missions which include predetermined-altitude stabilizations.

To that end the process of the invention for altitude-stabilizing an atmospheric balloon and comprising means to vary its specific weight comprises the use of a balloon provided with an inter-pole link extending from its upper to its lower poles and in controlling means designed to vary the balloon's specific weight using this inter-pole link in such a manner that an increase in the tension T applied to said link shall act on these means to reduce the specific weight.

The term "inter-pole link" denotes any component or assembly of components of longitudinal shape extending between the poles of the balloon and physically fastened either to the poles themselves or near them, or to auxiliary manner, this link as a rule will be flexible and can be one cable, several cables, one flexible sleeve or several sleeves, etc.

The balloon being used can be of the type described in the French patent application 80.00343 filed by the applicant on Jan. 4, 1980 (or U.S. Pat. No. 4,420,130) and evincing an envelope with symmetry of revolution about one axis and comprising an approximately cylindrical portion.

The length L of the inter-pole link is adjusted as a function of the contemplated mission to a value depending on the natural distance $D_p$ between the two poles when the balloon is filled. To keep the balloon limp at a constant altitude or at a slowly varying altitude, this length L generally shall be adjusted to a value $L_o \geq D_p$.

When the balloon in its filled state is descending, the distance D between the poles increases from the value $D_p$. In the absence of the inter-pole link, this distance might grow to a limiting value $D_F$ very close to the envelope gore length. In the presence of the inter-pole link, which exceeds $D_p$ but is less than $D_F$, when the inter-pole distance D becomes equal to the length $L_o$ of the link, a tension T arises in the link which increases as the descent continues and can decrease only if the balloon rises again.

According to the invention this tension T is used to actuate means for varying the balloon's specific weight: when this tension exceeds a threshold, it acts on these means to reduce the specific weight, whereby the descent is decelerated and the balloon is stabilized.

In the case of a balloon equipped with jettison means known per se, these means are controlled by the inter-pole link so as to cause jettison when the tension T exceeds a predetermined tension threshold $t_d$.

In the case of a hot-air balloon equipped with suitable combustion-fluid burners, the combustion rate is controlled by the inter-pole link in such a manner that said rate increases when the tension T exceeds a given threshold $t_d'$.

For some missions and some balloon types, the descending stabilization implemented by the above defined process will be enough (considering in particular the natural ascent stability of certain balloons, as already mentioned).

In other cases however a balloon is used which comprises means for varying its specific weight both by lowering and increasing it. In the process of the invention, these means are controlled by the inter-pole link so that an increase in the tension T in said link acts on these means to reduce the specific weight and a decrease in said tension acts to increase said specific weight.

With respect to an atmospheric balloon comprising both jettison means and aerostatic gas evacuation means, the link controls the jettison when its tension exceeds the threshold $t_d$ and controls the evacuation when this tension drops below a threshold $t_e < t_d$. To stabilize the balloon at a desired altitude level, it suffices to adjust the length L of the inter-pole link and the thresholds $t_e$ and $T_d$ so that the tension T in the link at the altitude of the desired level be between $t_e$ and $t_d$. The link is inactive as long as its tension remains between these values (that is, as long as the balloon remains at the desired altitude level). If, for some reason, the balloon should begin the descend, the tension T increases and beyond the threshold $t_d$ causes a jettison whereby the descent is stopped and a new ascent takes place. If on the other hand the balloon should rise, the tension T drops, and below the threshold $t_e$ causes evacuation of the aerostatic gas, whereby the rise stops and a new descent takes place. It must be borne in mind that the condition $t_e < t_d$ prevents simultaneous occurrence of jettison and aerostatic gas evacuation.

In the case of a hot-air ballon, the combustion-gas flow-rate is controlled by the inter-pole link so as to increase from an equilibrium value when the tension T in the link rises above the threshold $t_d'$ and to decrease from this equilibrium value when the tension T drops below a threshold $t_e' \leq t_d'$.

The present invention also covers an atmospheric balloon to implement the process described above. This balloon comprises an envelope made of a flexible hermetic material, a jettison reservoir located below the balloon, a jettison member associated with the reservoir to cause a controlled jettison of ballast, and, possibly, an aerostatic gas evacuation aperture in the ballon envelope with a movable sealing member for this aperture. In the present invention, said balloon is provided with an inter-pole link between its upper and lower poles, said link being fastened to the jettison member so as to act on it beyond a predetermined tension-threshold $t_d'$ and where such is present, also fastened to the movable sealing member so as to close it beyond a predetermined tension threshold $t_e$.

The invention furthermore covers a hot-air aerostatic balloon comprising an envelope made of a flexible, hermetic material and open at its lower part, a burner hooked-up in the vicinity of this lower pole, and means for supplying the burner with combustion fluid from a tank. According to the invention, the aerostatic balloon comprises an inter-pole link between the upper and lower poles of the balloon, the link being fastened to the burner supply means so as to adjust the combustion fluid flow rate as a direct function of the tension in said link.

DESCRIPTION OF THE DRAWINGS

Other features, purposes and advantages of the invention will become more clear in relation to the attached drawings illustrating this invention by means of embodiments.

FIG. 1 is a diagrammatic view of one embodiment of the atmospheric balloon of the invention;

FIG. 2 is a detailed view in cross-section of the lower part of the balloon;

FIG. 3 shows a force diagram relating to the balloon's jettison member;

FIG. 4a through 4e and 5a through 5e are explanatory diagrams illustrating the operation of the members of the balloon;

FIG. 6 is a schematic graph of the balloon trajectory;

DESCRIPTION OF THE INVENTION

Figure 8:
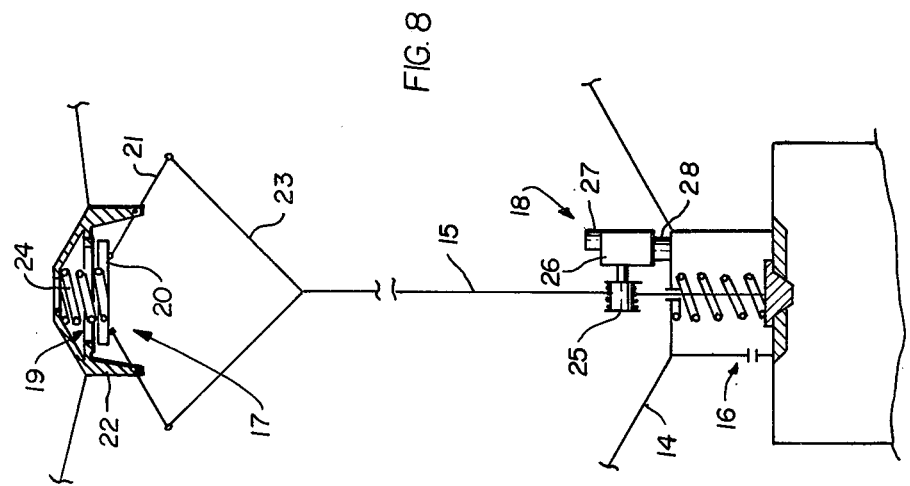
FIG. 8 is a partial cross-section of another embodiment of the balloon.

The atmospheric ballon illustratively shown in FIGS. 1 and 2 is a pressurized balloon consisting of an envelope 1 of which the upper and lower poles 2 and 3 respectively are joined by a link 4. A basket 5 associated with jettison means 6 is located below the lower pole 3.

The envelope 1 can be made by the method described in French patent application No. 80.00343 (or U.S. Pat. No. 4,420,130) mentioned above using a plurality of polyethylene film gores capable of withstanding the tangential tensions in all the directions in its plane (i.e., circumferential and longitudinal ones). These gores are provided with a rectangular segment so that their assembly at the edges enables formation of a cylindrical portion 1a extended at the top and at the bottom by segments covering toward the poles of the balloon.

The link 4 can be flexible but non-stretching cable. In this example, this link is fastened in the vicinity of the upper pole to a disk-shaped piece to which are fixed the upper gore ends of the envelope. At the bottom, near the lower pole, the link 4 is coupled to the jettison means as shown in FIG. 2 so as to act on these beyond a tension threshold $t_d$ applied to this link.

In the example, the jettison means comprise a tank 7 for a fluid kept pressurized by a pressurizing gas 5 separated from the fluid by a flexible membrane 8. The fluid constituting the ballast can be in particular liquid freon which will vaporize upon release.

The tank 7 comprises an output orifice with which cooperates a valve 9 acting as the jettison member. The valve 9 is housed in a cylindrical body 10 supported by the balloon and acting as the connection between this balloon and the basket. The body 10 is perforated with evacuation holes such as 11 to permit the escape of the ballast fluid to the outside when the valve 9 is open.

Near the lower pole, the link 4 is designed to penetrate in an essentially hermetic manner the body 10 and it is fixed at its lower end to the jettison valve 9. Elastic means such as the spring 12 are arranged in the body 10 so as to force the valve toward its closed position. This spring 12 is calibrated and permits adjusting the tension threshold $t_d$ beyond which the link 4 controls the valve opening.

The forces acting on the valve are the following (FIG. 3):
- the link tension T direct upward,
- the force $p_s$ also directed upward and caused by the pressure p of the fluid on the valve (surface s)
- the downward return force of the spring, equal to R in the closed state.

Accordingly the valve 9 opens at a tension threshold $t_d = R - ps$ and remains open as long as the tension $T \geq t_d$.

With K the spring coefficient, the upward displacement $\Delta x$ of the valve is given for a tension $T \geq t_d$ in the link by $\Delta x = K(T + ps - R)$.

Therefore this displacement is proportional to the tension T, whereby the jettisoned mass is directly related to the tension T and to the duration in which this tension T is effective. This enables stabilization of the balloon at an altitude which is a function of the system parameters and with oscillations of which the amplitude also depends on these parameters.

In the examples of FIGS. 2 and 3, the valve 9 operates symmetrically, that is, the tension threshold $t_d$ at which this valve opens is equal to the threshold at which it also closes again (the effective valve area acted on by the ballast fluid being the same whether the valve is open or closed).

Under these conditions, the balloon oscillations are damped and the balloon tends to stabilize at an equilibrium altitude. FIGS. 4a through 4e and 5a through 5e schematically show the behavior of such a balloon. The balloon is assumed to be initially entirely filled at a maximum altitude (FIG. 4a). The length $L_o$ of its link between the poles is adjusted to a value exceeding the natural distance $D_p$ separating the poles in this condition -- the link is loose and the jettison valve is closed (FIG. 5a).

If it is assumed that by a diffusion phenomenon (or any other such phenomenon as calibrated leakage, evacuation of aerostatical gas. etc.) the balloon begins descending, the envelope deforms and the inter-pole distance increases until it equals the link $L_o$ (FIG. 4b), and a slight tension T appears in the link (FIG. 5b). This tension is less than the threshold tension $t_d$ and the balloon continues descending.

The tension T increases until it exceeds $t_d$ (FIG. 4c); the valve 9 then opens and causes the initiation of jettison (FIG. 5c).

The descent rate of the balloon decreases until it is null and the balloon rises again to return to its link tension $t_d$ (FIG. 4d). The valve closes again and stops the ballast discharge.

The rate of rise decreases until it is null, and the balloon peaks at an altitude lower than that of its wholly filled state (FIG. 4e). The link remains taut but the tension in it is less than the threshold $t_d$. In this manner the balloon can be stabilized by means of a trajectory consisting of a sequence of damped oscillations, one of which is graphically illustrated in FIG. 6.

Figure 7:
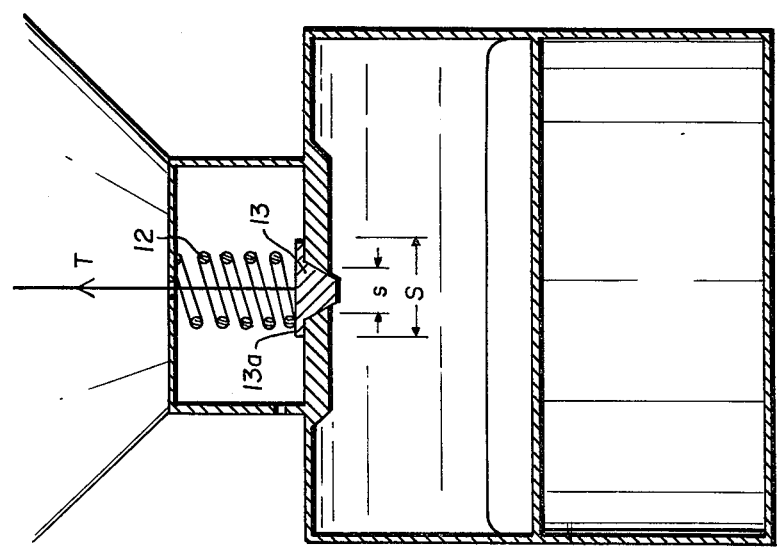
FIG. 7 is a detailed view in cross-section of the lower part of a variation of the balloon.

As regards the variation shown in FIG. 7, the valve 13 operates asymmetrically and comprises a heel 13a with an effective area S larger than the area s of the part applied to its seat. When such a valve is closed, it will require the tension T to become the threshold $t_d$ to open, but thereupon it will also close again once this tension becomes less than a different closing threshold $\theta_d$, where $\theta_d < t_d$. Thus, once open, the valve remains in this state as along as the tension exceeds $\theta_d$.

Under these conditions it is possible to achieve balloon stabilization at larger and undamped vertical oscillations. This arrangement is especially significant in order to explore an atmosphere within two specified altitudes.

The partial view of FIG. 8 shows another embodiment mode wherein the balloon consists of an envelope 14 of the same type as before but where the inter-pole link 15 comprises jettison means 16 located underneath the lower pole and similar to that described above; aerostatic gas evacuation means 17 located near the upper pole; and means 18 regulating the length of the inter-pole link 15.

The evacuation means 17 consist of an evacuation aperture 19 in the envelope and of a movable member 20 to seal said aperture. The inter-pole link 15 is coupled at the top to this member 20 to actuate it toward closure beyond a predetermined tension threshold $t_e$.

In the example, the closure member 20 consists on one hand of a valve located opposite to and below a support means surrounding the evacuation aperture 19 and on the other hand of reversing levers 21 rigidly fixed to the envelope by brackets 22 fastened along the length of said levers. Each reversing lever 21 is connected at one end to the valve 19 and at the other to the inter-pole link 15 by means of auxiliary cables 23, whereby a tension T from the link toward the bottom tends to actuate the valve 19 toward closure.

This valve functions together with elastic means such as the spring 24 whereby it is acted on in the direction of its open position. This spring is calibrated so as to adjust the evacuation-tension threshold $t_e$ to a predetermined value (a threshold below which the valve 20 is open and above which it is closed). If the jettison-tension threshold is $t_d$, the calibration is such that $t_e < t_d$.

Thus, if the tension T is less than $t_e$, the aerostatic gas will be evacuated and the balloon tends to descend or to decelerate any rise; if the tension T is between $t_e$ and $t_d$, there is neither jettison nor evacuation of the aerostatic gas, and no action is exerted on the balloon by the means of the invention. Lastly, if the tension T exceeds $t_d$, there will be jettison and the balloon tends to rise or to decelerate any descent.

Consequently the balloon tends to return within an altitude range corresponding to $t_e \leq T \leq t_d$. For jettison means 16 and evacuation means 17 of specific parameters, this altitude range can be adjusted by controlling the length L of the inter-pole link to an appropriate value larger than or equal to the natural distance $D_p$ between the poles for the filled balloon state.

In the example of FIG. 8, the balloon is provided with adjustment means 18 acting on said length and capable of providing this length in several values $L_1$, $L_2$ . . . in accordance with a predefined program. The balloon therefore is designed to successively explore several altitude ranges.

In particular these adjustment means 18 may comprise means such as the drum 25 for winding the link, rotational drive means such as the winch 26 for said winding means, and control means such as the control logic 27 acting on the winch in predetermined sequences. The assembly can be supported from the envelope by a support plate 28 preferably located near the lower pole (though it may also be located near the upper pole). The control logic 27 can be preset to assure the application of a predetermined program, it can also be implemented by remote control.

Figure 10:
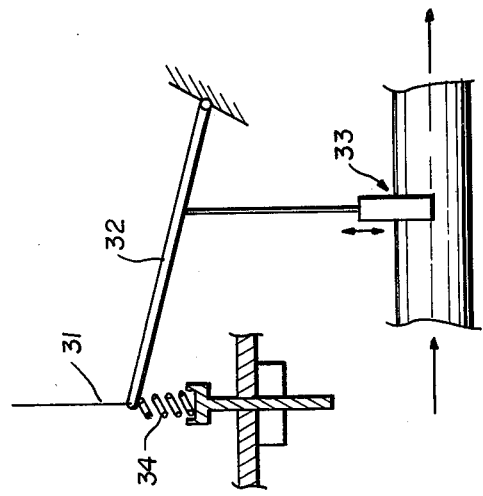
FIG. 10 is a detailed diagram illustrating the control for the combustion gas rate flow of said hot-air balloon.
Figure 9:
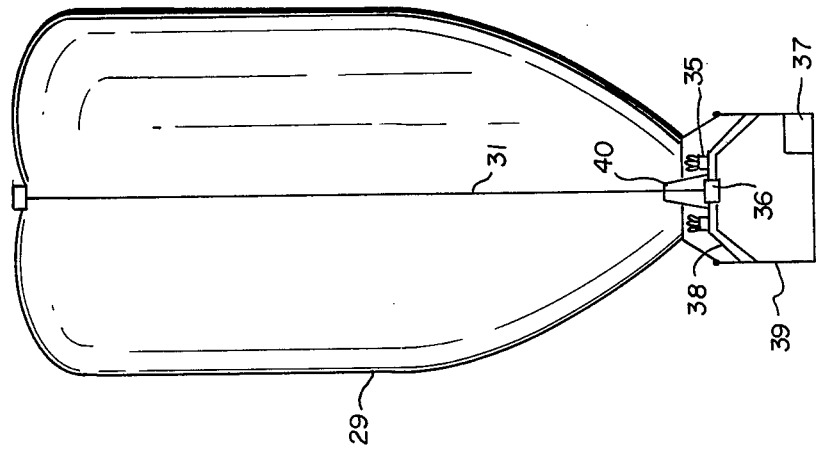
FIG. 9 is a diagram of a hot-air ballon equipped in accordance with the invention.

Illustratively FIGS. 9 and 10 additionally show the application of the invention to a hot-air balloon. This balloon consists of an envelope 29 made of a flexible material and open at its lower pole, and possibly with a cylindrical segment as previously described. This balloon is provided with a burner which in this example consists of a circular flame array 35 connected to supply means comprising a control-casing 36 for the gas-flow rate and a pressurized reservoir 37. This casing and the flame array are mounted on a rigid support 38 connected to the basket 39.

The hot-air balloon is provided with an inter-pole link 31 extending from its upper pole to its lower pole; this link is fastened to the casing 31 supplying the burner in such a manner that the combustion-fluid flow rate is directly controlled by the tension in said link. At its lower part the link is protected by a thermal protection cone 40 with an aluminized outer surface.

The link 31 can act on a pivot lever 32 controlling a sealing valve in the burner supply circuit and diagrammatically indicated by 33. A return spring 34 cooperating with a calibration system allows adjusting the equilibrium altitude as a function of the various system parameters.

If the descent drops below this altitude, the tension increases and causes a higher combustion-gas flow-rate with respect to its equilibrium value. The temperature of the rise-gas increases and the descent rate drops until the balloon stops and rises again.

When rising and exceeding the equilibrium altitude, the mechanism proceeds in the reverse sequence and the balloon then is made to descend due to a drop in the gas temperature.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. An altitude stabilizing process for an aerostatic balloon including a ballast tank enclosing ballast and having means for varying the specific weight of the balloon by evacuating ballast and providing upper and lower poles, the process comprising providing a link member attached to said upper and lower poles, providing tension responsive control means connected to said specific weight varying means and said link member, and operating said balloon, whereby an increase in the tension (T) in said link member acts on said specific weight varying means and causes a reduction of the specific weight of said balloon by evacuating ballast from said ballast tank.

2. A process as in claim 1 further comprising the steps of, controlling said ballast jettison means so as to cause ballast jettison when the tension (T) in said link member exceeds a pre-determined threshold tension ($T_d$).

3. A process as in claim 2 and including causing jettison of a ballast mass in relation to the tension (T) in said link member and the duration that the tension (T) in said link member exceeds said predetermined threshold ($T > t_d$).

4. A process as in claim 1 and wherein said balloon comprises a hot air balloon, providing a burner for heating the air in said hot air balloon, providing a feed of combustion fluid to said burner, controlling the flow-rate of combustion fluid to said burner in relation to the tension (T) in said link member so that the flow rate increases when the tension (T) in said link member increases above a predetermined threshold $t_d'$).

5. A process as in claim 1, 2, 3 or 4 and including maintaining a limp-state balloon at a substantially constant or slowly variable altitude by adjusting the length ($L_o$) of said link member to a value at least equal to the natural distance ($D_p$) between said poles when said balloon is filled.

6. A process as in claim 1, 2, 3 or 4 and including operating said balloon so that a decrease in the tension (T) in said link member causes an increase in the specific weight of said balloon.

7. A process as in claim 6 and wherein said specific weight varying means comprises evacuation means for aerostatic gas, and controlling said evacuation means so as to cause evacuation of aerostatic gas when the tension (T) in said link member drops below a predetermined threshold value ($t_e$, thus $t_e < t_d$).

8. A process as in claim 7 and including stabilizing said balloon at a plurality of selected altitudes by varying the length (L) of said link member at each selected altitude level to a length such that the tension (T) is said link member at the selected altitude is between said threshold values ($t_e$, $t_d$).

9. A process as in claim 4 and including controlling the flow-rate of combustion fluid to said burner in relation to the tension (T) in said link member so that the flow rate increases beyond an equilibrium value when the tension (T) in said link member exceeds said predetermined threshold ($t_d'$) and decreases below said equilibrium value when the tension (T) in said link member falls below a threshold limit ($t_e'$, $t_e' \leq t_d'$).

10. An aerostatic balloon comprising an envelope (1) of flexible, hermetic material, a jettison tank (7) located below the balloon and ballast-jettison means (9,13) associated with the tank for causing ballast jettison upon command, said balloon comprising an inter-pole link member (4,15) connecting its upper pole (2) and its lower pole (3) and fastened to said jettison means in such a manner as to actuate said jettison means beyond a given tension threshold $t_d$ in said link member.

11. A balloon as in claim 10, wherein said ballast tank (7) comprises a pressurized fluid tank suspended from the lower balloon pole and said jettison means (9,13) comprises a jettison valve cooperating with a discharge orifice in the tank, said link member (4,15) being fixed at its lower end to said jettison valve (9).

12. A balloon as in claim 11, characterized in that said jettison valve (9) includes elastic means (12) urging said jettison valve toward its closure position, said elastic means being calibrated to adjust the opening tension threshold $t_d$.

13. A Balloon as in claim 12, characterized in that said jettison valve (13) includes control means permitting said jettison valve to open above the tension threshold $t_d$, and to close again below a closure tension threshold $\theta < t_d$ so that said valve once open remains in this state as long as the tension remains above $\theta_d$.

14. A balloon as in claim 12, and wherein said jettison valve (9) includes means for opening said valve above the tension threshold $t_d$ and closing said valve below the same tension threshold.

15. A balloon as in claim 10,11,12,13 or 14, and including an aperture in said envelope for evacuating aerostatic gas and a movable member (20) for closing said aperture, said link member (15) being coupled with said movable member (20) so as to actuate said movable member toward closure beyond a given tension threshold $t_e$.

16. A balloon as in claim 15, wherein the evacuation aperture and the movable closure member (20) are arranged near the upper balloon pole, and wherein said link member (15) is fastened at its upper end to said movable member (20) so as to actuate it toward closure, said movable member (20) including elastic means (24) urging it toward its open position.

17. A balloon as in claim 16, characterized in that said movable (20) comprises valve means located opposite to and below a support surrounding said evacuation aperture and reversing levers (21) solidly joined to said envelope, each reversing lever (21) being connected at one end to said valve means and at the other end to said inter-pole link member.

18. A balloon as in claim 16 and wherein said elastic means (24) is calibrated so as to adjust the evacuation tension threshold $t_e$ to a given value less than the jettison tension threshold $t_d$.

19. A balloon as in claim 17 and wherein said elastic means (24) is calibrated so as to adjust the evacuation tension threshold $t_e$ to a given value less than the jettison tension threshold $t_d$.

20. A balloon as in claim 16 and wherein the length ($L_o$) of said link member is equal to or greater than the distance between the upper and lower poles of said balloon in the wholly filled state.

21. A balloon as in claim 16 and including means (18) for adjusting the length of said inter-pole link member.

22. A balloon as in claim 21, and wherein said adjusting means (18) comprise means (25) for winding the link and borne by the envelope near one of the poles so as to be located in the path of said link, and including means (26) for rotationally driving said winding means and means (27) for controlling said drive means in predetermined sequences.

23. A balloon as in claim 16 and wherein said envelope (1) evinces a symmetry of revolution about one axis and comprises an approximately cylindrical segment (1a), an upper pole (3) located on the axis of revolution and interconnected by said link member (4) made of a substantially non-stretching material.

24. A aerostatic balloon of the hot-air type comprising a flexible-material envelope (29) open at its lower pole, a burner (30) suspended in the vicinity of the lower pole and supply means for feeding combustion fluid to said burner from a tank, an inter-pole link member (31) extending from its upper to its lower pole and coupled to said supply means of said burner so as to adjust the combustion-fluid flow-rate as a direct function of the tension in said link member.

* * * * *